United States Patent [19]

Horlein et al.

[11] 3,917,635
[45] Nov. 4, 1975

[54] 2-CARBOMETHOXY-AMINOBENZIMIDAZOLES

[75] Inventors: Gerhard Hörlein, Frankfurt am Main; Hilmar Mildenberger, Kelkheim am Taunus; Arno Kröniger, Hofheim am Taunus; Kurt Härtel, Hofheim am Taunus; Dieter Düwel, Hofheim am Taunus; Reinhard Kirsch, Hofheim am Taunus, all of Germany

[73] Assignee: Hoechst Aktiengesellschaft, Frankfurt am Main, Germany

[22] Filed: Nov. 20, 1973

[21] Appl. No.: 417,640

[30] Foreign Application Priority Data
Nov. 22, 1972 Germany............................ 2257184

[52] U.S. Cl.............................. 260/309.2; 424/273
[51] Int. Cl.² ........................................ C07D 235/32
[58] Field of Search................................. 260/309.2

[56] References Cited
UNITED STATES PATENTS

| | | | |
|---|---|---|---|
| 3,641,048 | 2/1972 | Dittmar............................ | 260/309.2 |
| 3,711,503 | 1/1973 | Widdig et al. .................. | 260/309.2 |
| 3,732,241 | 5/1973 | Moore ............................. | 260/309.2 |
| 3,817,760 | 6/1974 | Brake .............................. | 106/15 AF |

*Primary Examiner*—G. Thomas Todd
*Attorney, Agent, or Firm*—Curtis, Morris & Safford

[57] ABSTRACT

Benzimidazole derivatives of the formula

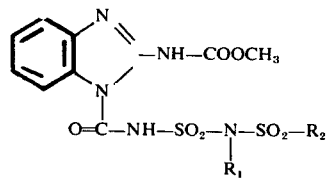

wherein $R_1$ is alkyl or cycloalkyl and $R_2$ is alkyl, haloalkyl, cycloalkyl or optionally substituted phenyl, benzyl or naphthyl, are valuable fungicides and anthelmintics.

8 Claims, No Drawings

2-CARBOMETHOXY-AMINOBENZIMIDAZOLES

The present invention provides benzimidazole compounds of the formula I

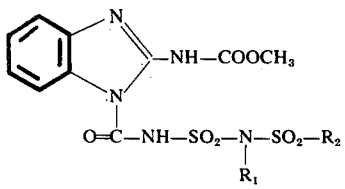

where $R_1$ is alkyl having from one to 12 carbon atoms or cycloalkyl having from four to eight carbon atoms and $R_2$ is alkyl having from one to 12 carbon atoms, halo-alkyl having from one to 20 carbon atoms, cycloalkyl having from five to eight carbon atoms, phenyl, benzyl or naphthyl, the last three optionally being substituted by halogen, alkyl having from one to four carbon atoms or alkoxy having from one to four carbon atoms, cyano and/or nitro.

Preferred radicals $R_1$ are alkyl having from one to six, especially from one to four carbon atoms, or cycloalkyl having from four to six carbon atoms, especially cyclohexyl.

Preferred radicals $R_2$ are alkyl having from one to 12 carbon atoms, cyclohexyl, methylphenyl, chlorophenyl, fluorophenyl or nitrophenyl.

The present invention provides also a process for the preparation of benzimidazoles of formula I, which comprises reacting 2-carbomethoxy-aminobenzimidazole of the formula II

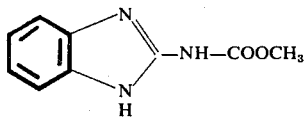

with a sulfonyl-isocyanate of the formula III

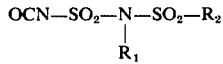

according to known methods.

A preferred embodiment of the process of the invention is the following: the 2-carbomethoxy-aminobenzimidazole (II) is suspended or dissolved in a solvent and the isocyanate is added with agitation. The reaction is generally slightly exothermal. Heating for some time in order to complete the reaction is also possible. The temperatures are preferably from 0° to 80°C, especially from 20° to 40°C, but the temperature range is not critical. The reaction product is generally obtained in a crystallized form and may be isolated by filtration.

The reaction products are characterized by elementary analysis, decomposition points and IR spectra.

Suitable solvents for the reaction are for example solvents of mean or weak polarity, especially those having low boiling points and which do not react with isocyanates, for example methylene chloride, chloroform, carbon tetrachloride, benzene; ethers such as diethyl ether, diisopropyl ether or tetrahydrofuran; esters such as methyl acetate and ethyl acetate; or ketones such as acetone or methylethylketone. Preferably, chloroform or methylene chloride are used.

The 2-carbomethoxy-aminobenzimidazole may be prepared according to the method described in J. Amer. Soc. 56, 144 (1934) by reaction of o-phenylenediamine with S-methyl-isothiourea-dicarboxylic acid-dimethyl ester.

The compounds of formula III may be prepared by reacting sulfonamides of the formula IV

with chlorosulfonyl-isocyanate at temperatures of from 80° to 200°C, preferably from 100° to 160°C.

The compounds of the invention have a good fungicidal, especially systemic, action and so are particularly useful for combating fungi which have entered plant tissues. This is especially important in the case of those fungus diseases which have a long incubation period and, after the outbreak of the infection, cannot be combated by the usual fungicides. The activity range of compounds of the invention is very broad and they are effective against a number of fungi important in crop farming, fruit growing, viti-culture, hop growing, and horticulture, for example, genuine mildew fungi (Erysiphaceae), Rhizoctonia spp., Scerotinia spp., Botrytis spp., rust fungi, Fusarium spp., Cercospora spp., Septoria spp., Microsphaerella spp., Fusicladium spp., Venturia spp., Cladosporium spp., Colletotrichum spp., Verticillium spp., Glocosporium spp., Cylindrosporium spp., Cercospora spp., Cercosporella spp., Ustilago spp., Penicillinum spp.

The compounds of the invention are also useful for protecting stored fruits or vegetables against fungus infection, for example, by species of Fusarium or Penicillium. Furthermore, they are suitable for protecting textiles, wood, dyes, coatings or paints against fungal infestation.

The present invention therefore provides pesticide, especially fungicides comprising benzimidazoles of formula (I) as active substance, especially in concentrations of from 0.5 to 80 %, in admixture or conjunction with one or more known formulation additives, for example, solid or liquid inert carriers, adhesives, wetting and dispersing agents and grinding auxiliaries, in the form of wettable powders, emulsions, suspensions, dusting powders or granules. The compounds of formula I may be mixed with other fungicides with which they form compatible mixtures.

As carrier material, mineral substances, for example, aliminium silicates, argillaceous earths, kaolin, chalks, siliceous chalks, talcum, kieselguhr or hydrated silicic acids can be used, or preparations of these mineral substances with special additives, for example, chalk with sodium stearate. As carrier material for liquid preparations, any suitable organic solvents may be employed, for example, toluene, xylene, dioxan, dimethyl formamide, dimethyl sulfoxide, ethyl acetate, tetrahydrofuran, chlorobenzene, and other similar substances.

Suitable adhesives are glue-like cellulose products or polyvinyl alcohols.

As wetting agents, any suitable emulsifiers may be used, for example, ethoxylated alkylphenols, salts of aryl- or alkyl-aryl-sulfonic acids, salts of oleyl-methyl-taurine or of ethoxylated benzene-sulfonic acids, or soaps.

Suitable dispersing agents are cellulose pitch (salts of ligninsulfonic acid), salts of naphthalenesulfonic acid or salts of oleyl-methyl-taurine.

As grinding auxiliaries, suitable inorganic or organic salts, for example sodium sulfate, ammonium sulfate, sodium carbonate and sodium bicarbonate, sodium thiosulfate, sodium stearate, or sodium acetate may be used.

The products of the process of the invention are furthermore valuable anthelmintics and can be used especially for combating nematodes and their different development stages parasitizing in the alimentary tract of man and animal. The products are administered orally or subcutaneously, the application concentration being in a range of from 0.5 to 5 mg/kg of body weight (s.c.) or from 2.5 to 50 mg/kg of body weight (p.o.). For an oral administration, solid application forms such as tablets, dragees, powders or granules are preferred, for a subcutaneous administration, liquid preparations such as emulsions, suspensions or solutions are used. For the formulation of such preparations, usual, physiologically acceptable auxiliaries and carriers are suitable, for example talc, lactose, magnesium stearate (solids), or water, paraffin oil or polyols such as polyethyleneglycol.

The activity of the compounds of the invention against Nematospiroides dubius, Ankylostomae in man and domestic animals, Haemonchus spp., Ostertagia spp., Trichostrongylus in ruminants, Hyostrongylus in pigs and other animals is especially pronounced.

The following examples illustrate the invention.

A. EXAMPLES OF PREPARATION

EXAMPLE 1

17.7 g (0.092 mole) of 2-carbomethoxy-aminobenzimidazole and 20 g (0.093 mole) of N-methyl-methanesulfonamido-N-sulfonylisocyanate were stirred in 200 ml of chloroform for 15 minutes at about 20°C. Subsequently, the reaction product was isolated by suction-filtration. Yield: 35 g. Melting point: 170°C (decomp.)

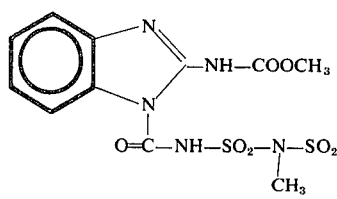

$C_{12}H_{15}N_5O_7S_2$  MW 405 calc. : N 17.3 %;  S 15.8 % found : N 17.4 %;  S 15.5 %

EXAMPLE 2

13.7 g (0.071 mole) of 2-carbomethoxy-aminobenzimidazole were suspended in 200 ml of methylethylketone, and 20 g (0.0725 mole) of N-methyl-benzenesulfonamido-N-sulfonylisocyanate were added. After 2 hours of refluxing, the reaction product was filtered off. Yield: 29.5 g. M.p.: 142°C (decomp.)

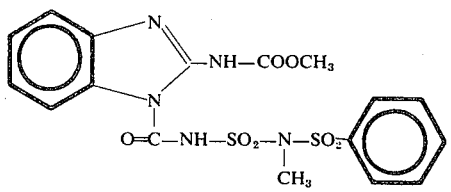

$C_{17}H_{17}N_5O_7S_2$  MW 467 calc. : N 15.0 %;  S 13.7 % found : N 14.8 %;  S 13.9 %

EXAMPLE 3

40 g (0.2 mole) of 2-carbomethoxy-aminobenzimidazole were introduced into 200 ml of chloroform, and 74 g (0.21 mole) of N-butyl-(p-chloro)-phenylsulfonamido-N-sulfonylisocyanate were added dropwise. After 20 hours of agitation at 20°C, the solution was concentrated, 100 ml of ether were added, and the reaction product was filtered off. Yield: 95 g. M.p.: 75°C (decomp.)

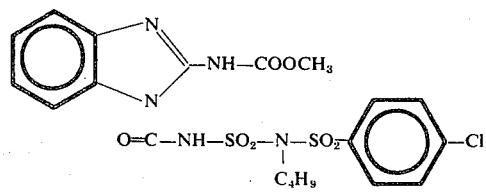

$C_{20}H_{22}ClN_5O_7S_2$  MW 543 5 calc. : N 12.9 %;  S 11.8 % found : N 13.3 %;  S 11.4 %

EXAMPLE 4

In the manner as described in Example 3, 80 g of reaction product were isolated from a batch of 46 g (0.24 mole) of 2-carbomethoxy-aminobenzimidazole and 84 g (0.24 mole) of N-propyl-(p-nitro)-phenylsulfonamido-N-sulfonyl-isocyanate. Melting point 156°C.

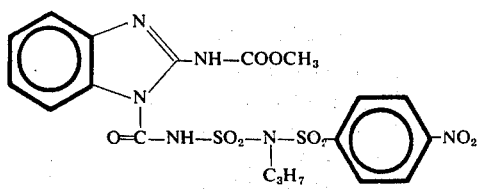

$C_{19}H_{20}N_6O_9S_2$   MW 540 calc. : N 15.5 %;   S 11.8 % found : N 15.8 %;   S 11.3 %

EXAMPLE 5

39.2 g (0.206 mole) of 2-carbomethoxy-aminobenzimidazole and 80 g (0.206 mole) of N-cyclohexyl-(p-nitro)-phenylsulfonamido-N-sulfonyl-isocyanate were refluxed with agitation in 300 ml of methylene chloride for 5 hours. Non-reacted starting compound was suction-filtered, the filtrate was concentrated, and 200 ml of ether/petrol ether (1 : 2) were added. The reaction product was obtained in the form of a colorless powder.

fonyl-isocyanate in 200 ml of tetrahydrofuran. Melting point: 159° – 162°C.

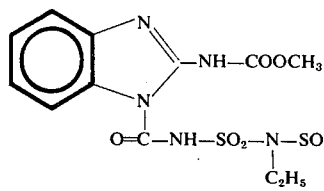

$C_{18}H_{18}ClN_5O_7S_2$   MW 515.5 calc. : N 13.6 %;   S 12.4 % found : N 13.2 %;   S 12.1 %

EXAMPLE 7

28.6 g (0.15 mole) of 2-carbomethoxy-aminobenzimidazole and 62 g (0.2 mole) of N-methyl-(p-chloro)-phenyl-sulfonamido-N-sulfonyl-isocyanate in 200 ml of chloroform were stirred for 15 hours at about 20°C. The reaction product was isolated by filtration. Yield: 60 g. M.p.: 157° – 159°C (decomp.)

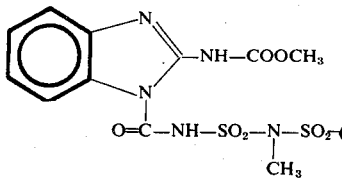

$C_{17}H_{16}ClN_5O_7S_2$   MW 501,5 calc. : N 13.95 %;   S 12.70 % found : N 13.9 %;   S 12.3 %

Yield: 64 g. M.p. 85° – 87°C.

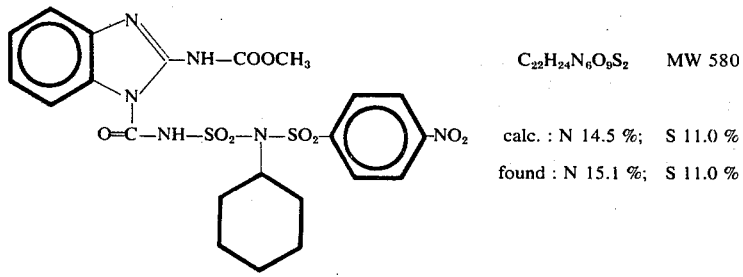

$C_{22}H_{24}N_6O_9S_2$   MW 580 calc. : N 14.5 %;   S 11.0 % found : N 15.1 %;   S 11.0 %

EXAMPLE 6

In a manner as described in Example 1, 42 g of reaction product were obtained from 28.6 g (0.15 mole) of 2-carbomethoxy-aminobenzimidazole and 64.6 (0.2 mole) of N-ethyl-(p-chloro)-phenylsulfonamido-N-sul-

EXAMPLE 8

In the manner as described in Example 7, 24 g of reaction product were obtained from a batch of 10 g (0.0525 mole) of 2-carbomethoxy-aminobenzimidazole and 38 g (0.1 mole) of N-cyclohexyl-(p-chloro)-phenyl-sulfonamido-N-sulfonylisocyanate in 200 ml chloroform. Melting point: 60°C (decomp.).

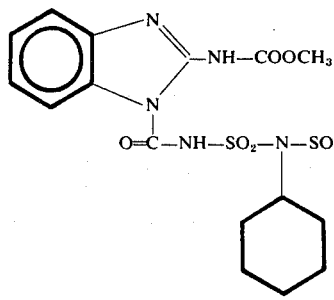

$C_{22}H_{24}ClN_5O_7S_2$   MW 569,5 calc. : N 12.3 %;   S 11.2 % found : N 12.5 %;   S 11.5 %

EXAMPLE 9

28.6 g (0.15 mole) of 2-carbomethoxy-aminobenzimidazole were suspended in 300 ml of anhydrous acetic acid ethyl ester, and 66.4 g (0.2 mole) of N-butyl-p-tolyl-sulfonamido-N-sulfonylisocyanate were added at 20°C. The mixture was stirred for about 10 hours at 35°C, filtered off the portion of non-reacted starting product, and concentrated. After addition of 200 ml of ether to the residue, 52 g of reaction product having a melting point of 125° – 128°C (decomp.) were obtained.

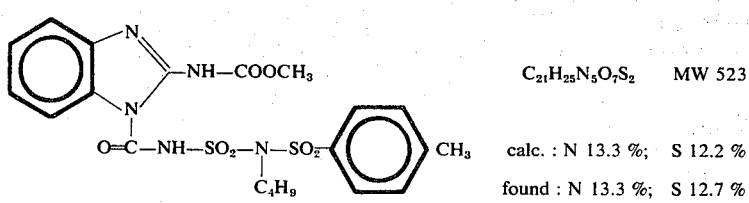

$C_{21}H_{25}N_5O_7S_2$    MW 523 calc. : N 13.3 %; S 12.2 %
found : N 13.3 %; S 12.7 %

EXAMPLE 10

28.6 g (0.15 mole) of 2-carbomethoxy-aminobenzimidazole and 46 g (0.2 mole) of N-methyl-ethylsulfonamido-N-sulfonylisocyanate were stirred in 400 ml of chloroform for about 9 hours at 25°C. The reaction product was isolated by filtration. Yield: 53 g. M.p.: 141° – 144°C

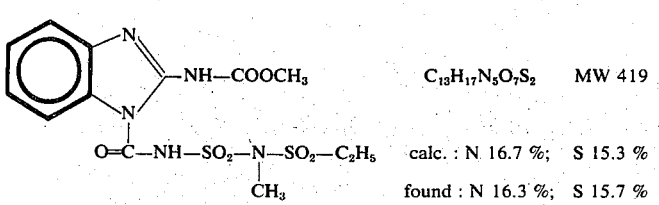

$C_{13}H_{17}N_5O_7S_2$   MW 419 calc. : N 16.7 %; S 15.3 %
found : N 16.3 %; S 15.7 %

EXAMPLE 11

19 g (0.1 mole) of 2-carbomethoxy-aminobenzimidazole and 29 g (0.12 mole) of N-ethyl-ethylsulfonamido-N-sulfonylisocyanate were stirred in 300 ml of chloroform for 24 hours at room temperature (about 20°C). The solution was concentrated and ether was added to the residue. The reaction product was subsequently isolated by filtration. Yield: 41 g. M.p. 140°C (decomp.)

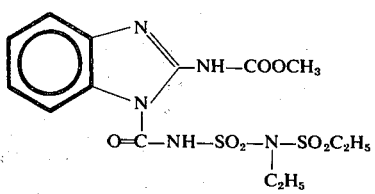

$C_{14}H_{19}N_5O_7S_2$    MW 433 calc. : N 16.1 %; S 14.8 %
found : N 15.8 %; S 14.8 %

EXAMPLE 12

In the manner as described in Example 11, 41 g of reaction product having a melting point of 155°C (decomp.) were isolated from the batch of 19 g (0.1 mole) of carbomethoxy-aminobenzimidazole and 35.2 g (0.13 mole) of N-ethyl-butylsulfonamido-N-sulfonylisocyanate in 400 ml of methylene chloride.

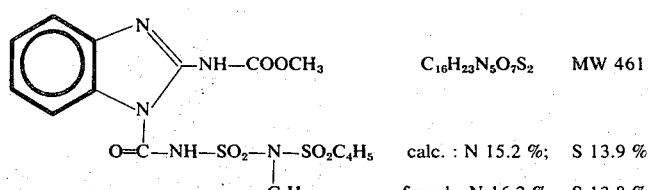

$C_{16}H_{23}N_5O_7S_2$   MW 461 calc. : N 15.2 %; S 13.9 %
found : N 16.2 %; S 13.8 %

In analogy to Example 12, the following substances can be obtained:

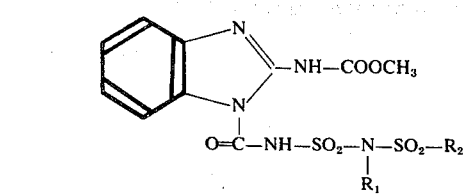

| EXAMPLE | R₁ | R₂ |
|---|---|---|
| 13 | —C₄H₉(n) | —CH₃ |
| 14 | —CH₃ | —C₄H₉(n) |
| 15 | —C₂H₅ | —CH₃ |
| 16 | —CH₃ | —C₆H₅ |
| 17 | —CH₃ | —CH₂CH₂Cl |
| 18 | —CH₃ | —C₈H₁₇(n) |
| 19 | —CH₃ | 3,5-(CH₃)₂-C₆H₃— |
| 20 | —CH₃ | 4-F-C₆H₄— |
| 21 | —CH₃ | 2-Cl-4-CH₃-C₆H₃— |
| 22 | —CH(CH₃)₂ | —C₆H₅ |
| 23 | —C₂H₅ | 4-CH₃-C₆H₄— |
| 24 | —C₂H₅ | —C₁₂H₂₅ |
| 25 | —CH₃ | —C₈H₁₇(n) |
| 26 | —CH₃ | cyclopentyl |
| 27 | —CH₃ | cyclopentyl |
| 28 | —CH₃ | cyclohexyl |
| 29 | —CH₃ | 4-CH₃-cyclohexyl |
| 30 | —C₄H₉(n) | —C₂H₅ |
| 31 | —CH(CH₃)₂ | —C₂H₅ |
| 32 | —C₆H₅ | —C₄H₉(n) |
| 33 | —CH₃ | —C₁₂H₂₅ |
| 34 | —CH₃ | —C₁₈H₃₇ |
| 35 | —C₂H₅ | —CH₂CH₂Cl |
| 36 | —C₂H₅ | cyclopentyl |
| 37 | —C₂H₅ | cyclohexyl |
| 38 | —CH₃ | 4-CH₃-cyclohexyl |
| 39 | —CH₃ | cyclohexyl |
| 40 | —CH₃ | —CH₂—C₆H₅ |
| 41 | —C₂H₅ | —C₆H₅ |
| 42 | —CH₃ | 4-CH₃-C₆H₄— |
| 43 | cyclohexyl | —C₆H₅ |

-continued

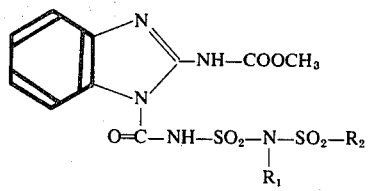

| EXAMPLE | R₁ | R₂ |
|---|---|---|
| 44 | —C₂H₅ | 2,6-(CH₃)₂-C₆H₃— |
| 45 | —C₂H₅ | 2,4-(CH₃)₂-C₆H₃— |
| 46 | —C₂H₅ | 4-C₂H₅-C₆H₄— |
| 47 | —C₂H₅ | 4-CH(CH₃)₂-C₆H₄— |
| 48 | —C₂H₅ | 3-Cl-C₆H₄— |
| 49 | —C₂H₅ | 4-Br-C₆H₄— |
| 50 | —C₂H₅ | 2,5-Cl₂-C₆H₃— |
| 51 | —CH₃ | 3-Cl-4-CH₃-C₆H₃— |
| 52 | —CH₃ | 3-NO₂-C₆H₄— |
| 53 | —C₂H₅ | 3-CH₃-C₆H₄— |
| 54 | —C₄H₉(n) | 2-NO₂-4-Cl-C₆H₃— (with NO₂) |
| 55 | —CH₃ | 4-OCH₃-C₆H₄— |
| 56 | —CH₃ | 3-CN-C₆H₄— |
| 57 | —CH₃ | 1-naphthyl |
| 58 | —CH₃ | 6-Cl-2-naphthyl |

B. EXAMPLES OF APPLICATION

In the following examples of application, the following known compounds were used in their commercial form as comparative agents:

Compound I  Maneb (manganese-ethylene-bis-dithiocarbonate)

II 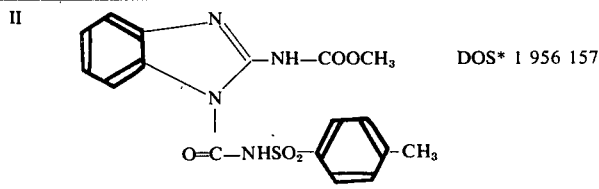 DOS* 1 956 157

III Zinob (zinc-ethylene-bis-dithiocarbamate)
IV Dinocap (2-[1-methylheptyl]-4,6-dinitro-phenyl-crotohate)
V Benomyl (2-carbomethoxyamino-1-n-butylcarbamoyl-benzimidazole)
　　　　　　　　　　　　　　　　　DOS* 1 956 157
VI BCM (2-carbomethoxyamino-benzimidazole)
　　　　　　　　　　　　　　　　　DOS* 1 620 175

*) DOS = German Offenlegungsschrift

EXAMPLE I

Sugar beet plants grown in pots in the 6-leaf stage were heavily infested with conidia of the beet leaf spot organism (*Cercospora beticola*) and placed in a moisture chamber at 25°C and a 100 % relative atmospheric humidity, where they were kept for one day. Subsequently, they were placed in a greenhouse having a relative atmospheric humidity of ofrm 80 to 90 % and a temperature of from 25°C. After an infection time of 10 days, the plants were sprayed, until drip-off, with the compounds cited in Examples 1 and 2. The application concentrations were 120, 60, 30, and 15 mg/l of spray liquor. As comparative agents, the compounds I and II were used in the same application concentrations. After drying of the spray liquor, the plants were placed again in the greenhouse. After an incubation period of 3 weeks, the plants were examined for infection with beet leaf spot. The evaluation was carried out visually, and the degree of infection expressed in % of infested leaf area, as compared to untreated, infested control plants (= 100). The results are shown in Table I.

TABLE I

| Compound of Example | % of leaf area infested with Cercospora at mg of active substance/liter of spray liquor | | | |
|---|---|---|---|---|
| | 120 | 60 | 30 | 15 |
| 1 | 0 | 0 | 0 | 5 |
| 2 | 0 | 0 | 3 | 12 |
| comp. agent I | 80 | 160 | 100 | 100 |
| comp. agent II | 0 | 5 | 15 | 35 |
| untreated | 100 | 100 | 100 | 100 |

EXAMPLE II

Tomato plants, in the stage of completely grown 3 leaves, were heavily infested with conidia of the leaf mould of tomatoes (*Cladosporium fulvum*), and placed for 24 hours in a moisture chamber having a temperature of 25°C and a relative atmospheric humidity of 100 %. They were then transferred to a greenhouse having a high relative atmospheric humidity and an optimum temperature for infection of 25°C. After an incubation period of 10 days, the plants were treated with the compounds according to Examples 1 and 2 in concentrations of 120, 60, and 30 mg/l of spray liquor until drip-off. As comparative agent, the compound II and III were used in the same concentrations.

After drying of the sprayed layer, the plants were again placed in the greenhouse and, after an incubation period of 3 weeks, examined for infection with leaf mould. The infection was examined visually, as usual, and the degree of infection was expressed in % of infested leaf area relative to untreated, infested control plants (= 100). The results are shown in Table II.

TABLE II

| Compound of Example | % infection with Cladosporium fulvum at mg of active substance/liter of spray liquor | | |
|---|---|---|---|
| | 120 | 60 | 30 |
| 1 | 0 | 0 | 10 |
| 2 | 0 | 0 | 5 |
| comp. agent III | 70 | 100 | 100 |
| comp. agent II | 5 | 15 | 35 |
| untreated | 100 | 100 | 100 |

EXAMPLE III

Cucumber plants in the two-leaf stage were heavily infested with conidia of the cucumber mildew (*Erysiphe cichoracearum*) and placed for 24 hours in a moisture chamber having a relative atmospheric humidity of 100 % and a temperature of 20°C. Subsequently, they were placed in a greenhouse having optimum infection conditions such as a high relative atmospheric humidity (80 – 90 %) and a temperature of from 20° to 22°C. After 5 days, the plants were treated until drip-off with the compounds according to Examples 1 and 2 in concentrations of 120, 60, 30 and 15 mg of active substance per liter of spray liquor.

As comparative agents, the compounds II and IV were used in the same concentrations of active substance.

After drying of the sprayed layer, the plants were again placed in the greenhouse, where they were kept until the outbreak of the disease 14 days after infection. Examination was carried out visually, as usual. The degree of infection was expressed in % of infested leaf area, relative to untreated control plants (= 100), as shown in Table III.

TABLE III

| Compound of Example | % infection with mildew at mg of active substance/liter of spray liquor | | | |
|---|---|---|---|---|
| | 120 | 60 | 30 | 15 |
| 1 | 0 | 0 | 0 | 10 |
| 2 | 0 | 0 | 0 | 5 |
| comp. agent IV | 0 | 15 | 35 | 60 |
| comp. agent II | 0 | 5 | 10 | 25 |
| untreated | 100 | 100 | 100 | 100 |

EXAMPLE IV

Apple seedlings in the 6-leaf stage were infested with conidia of the apple mildew (*Podosphaera leucotricha*) and placed in a greenhouse having a relative atmospheric humidity of from 80° to 90°C and a temperature of 20°C. After an infection time of 5 days, the plants were treated, until drip-off, with the compounds according to Examples 1 and 2 in concentrations of 60, 30, 15 and 7.5 mg/liter of spray liquor.

As comparative agents, the compounds II and IV were used in the same concentrations of active substance.

After drying of the sprayed layer, the plants were again placed in the greenhouse and, after an incubation period of 3 weeks, examined visually for infection with the apple mildew. The results are expressed in % of infested leaf area, relative to untreated, infested control plants (= 100).

TABLE IV

| Compound of Example | % of leaf area infested with mildew at mg of active substance/liter of spray liquor | | | |
|---|---|---|---|---|
| | 60 | 30 | 15 | 7.5 |
| 1 | 0 | 0 | 3 | 10 |
| 2 | 0 | 0 | 0 | 5 |
| comp. agent IV | 10 | 25 | 60 | 85 |
| comp. agent II | 0 | 5 | 16 | 23 |
| untreated | 100 | 100 | 100 | 100 |

EXAMPLE V

Winter wheat in the four-leaf stage was treated until drip-off with the following compounds: Examples 7, 6, 3, 9, 8, 5, 4, 10, 11 and 12. The application concentrations were of 120 and 60 mg of active substance per liter of spray liquor.

As comparative agents, the compounds V and VI were used in the same application concentrations. The test was carried out with a four times repetition.

After drying of the sprayed layer, the plants were heavily infested with conidia of the powdery mildew of cereals (*Erysiphe graminis*) and subsequently placed in a greenhouse having a temperature of from 20° to 22°C and a relative atmospheric humidity of from 80 to 90 %. After an incubation period of 14 days, the plants were visually examined for infection with mildew and the results expressed in % of infested leaf area, relative to untreated, infested control plants (see Table V).

The results of Table V show that the compounds of the invention, when the same molar amounts are used, have the same activity as comparative agent V, but are considerably more efficient than comparative agent VI.

EXAMPLE VI

Sugar beet plants in the 6-leaf stage were heavily infested with conidia of the beet leaf spot (*Cercospora beticola*) and placed dripping wet into a moisture chamber having a temperature of 25°C and a relative atmospheric humidity of 100 %.

After a residence time of 2 days in this chamber, the plants were transferred to a greenhouse having a temperature of from 25° to 26°C and a relative atmospheric humidity of from 85 to 90 %. After an infection time of 6 days, the plants were treated with the compounds cited in Example I and the comparative agents indicated there with a four times repetition. The application concentrations were 250, 125 and 60 ml of active substance/liter of spray liquor.

After drying of the sprayed layer, the plants were placed again in the greenhouse and, after an incubation time of 24 days, examined for infection with the beet leaf spot. The degree of infection was expressed in % of infested leaf area, relative to untreated, infested control plants.

As the results of Table VI show, the compounds of the invention have an excellent activity equivalent to comparative agent V and superior to comparative agent VI.

TABLE V

| Compound of Example | % of mildew infection at mg of active substance/liter of spray liquor | |
|---|---|---|
| | 120 | 60 |
| 7 | 0 | 10 |
| 6 | 0 | 10 |
| 3 | 0 | 8 |
| 9 | 0 | 10 |
| 8 | 0 | 12 |
| 5 | 0 | 15 |
| 4 | 0 | 10 |
| 10 | 0 | 15 |
| 11 | 0 | 15 |
| 12 | 0 | 15 |
| comparative agent/V | 0 | 10 |
| comparative agent VI | 0 | 15 |
| treated plants | 100 | 100 |

TABLE VI

| Compound of Example | % infection with *Cercospora* at mg of substance/liter of spray liquor | | |
|---|---|---|---|
| | 250 | 125 | 60 |
| 7 | 0 | 0 | 10 |
| 6 | 0 | 0 | 10 |
| 3 | 0 | 0 | 8 |
| 9 | 0 | 0 | 12 |
| 8 | 0 | 0 | 15 |
| 5 | 0 | 5 | 20 |
| 4 | 0 | 0 | 10 |
| 10 | 0 | 0 | 18 |
| 11 | 0 | 0 | 15 |
| 12 | 0 | 0 | 18 |
| Comparative agent V | 0 | 0 | 8 |
| Comparative agent VI | 5 | 15 | 30 |

TABLE VI-continued

| Compound of Example | % infection with Cercospora at mg of substance/liter of spray liquor | | |
|---|---|---|---|
| | 250 | 125 | 60 |
| untreated plants | 100 | 100 | 100 |

EXAMPLE VII

A test of anthelmintic activity was carried out as follows:

In order to cause artificial infection, 100 actively mobile larvae of *Nematospiroides dubius* in 0.3 ml of water were administered orally to about 4 weeks old mice. The animals so infected were kept in cages each containing two animals, and they were fed with standardized food and water ad libitum. After termination of the prepatency period, the animals were treated with the compound to be tested 1 to 3 consecutive days. 3 to 5 days after the last treatment, the animals were killed, the intestines were taken off and the worms were counted. The efficiency is expressed in percent of worm load of animals treated as compared with the worm infection of untreated control animals (controlled test). By a good anthelmintic effect there is to be understood the reduction of the worm load by more than 95 %.

In the following Table VII, a selection of compounds of the process of this invention and comparative products are listed.

TABLE VII

| Preparation of Example | Dose at 3 consecutive days (mg/kg) | Appl. | Effect |
|---|---|---|---|
| 4 | 300 | p.o. | >95 % |
| 3 | 400 | p.o. | >95 % |
| 6 | 300 | s.c. | 100 % |
| | 300 | p.o. | >95 % |
| 12 | 250 | s.c. | 100 % |
| | 350 | p.o. | 100 % |
| 10 | 200 | s.c. | >95 % |
| | 350 | p.o. | >95 % |
| 9 | 300 | p.o. | >95 % |
| methyridine | 180* | s.c. | 50 % |
| 2-(β-methoxyethyl)-pyridine | 220* | p.o. | 50 % |
| thiabendazole | 200* | s.c. | 50 % |
| 2-(4-thiazolyl)-benzimidazole | 750 | p.o. | 60 % |

*tolerance limit

EXAMPLE VIII

The efficiency of the products of the process of this invention was also proved by testing selected substances in animals of larger size; the results being listed in the following Table VIII. The success was determined by repeated examination according to the McMaster process of the amount of worm eggs excreted and, in the case of selected examples, by dissection of treated and untreated dogs with comparison of the worm load present (controlled test). Hookworms are very important parasites in human and veterinary medicine from a hygienic anad also economic point of view. The efficiency of the derivatives of this invention, however, covers also other economically important helminthes in man and animal.

TABLE VIII

| Preparation of Example | Parasite | Dose (mg/kg) | Appl. | |
|---|---|---|---|---|
| 4 | Ankylostomae | 1 × 20 | p.o. | 98 % |
| 6 | Ankylostomae | 1 × 20 | p.o. | 100 % |
| 10 | Ankylostomae | 1 × 20 | p.o. | 85 % |
| 9 | Ankylostomae | 1 × 20 | p.o. | 100 % |
| methyridin*[)] | Ankylostomae | 1 × 200 | s.c.***[)] | 0 % |
| thiabendazol**[)] | Ankylostomae | 1 × 500 | p.o. | 82 % |

*[)]McGregor, J.K., L.H. Lord a. A.A. Kingscote, Canadian Vet. J. 3, 67 – 68, 1962
**[)]Novilla, M.N. and R.F. Flauta, Philipp. J. Vet. Med. 6, 135 – 144, 1967.
***[)]usual treatment mode As is shown in Tables VII and VIII, the superiority of the products of the process of the invention over comparative products is established (1) with respect to the excellent effect at subcutaneous and/or oral administration, and (2) with respect to the small dose necessary.

We claim:

1. A compound of the formula I

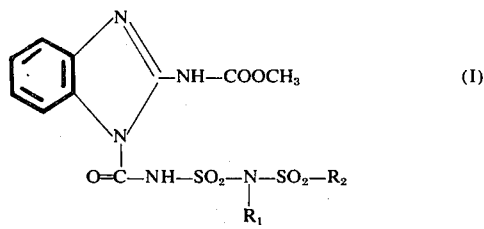

(I)

where $R_1$ is alkyl having from one to 12 carbon atoms or cycloalkyl having from four to eight carbon atoms and $R_2$ is alkyl having from one to 12 carbon atoms; halo-alkyl having from one to 20 carbon atoms; cycloalkyl having from five to eight carbon atoms; phenyl, benzyl or naphthyl phenyl, benzyl or naphthyl being mono or di substituted by halogen, alkyl having from one to four carbon atoms or alkoxy having from one to four carbon atoms, cyano and/or nitro.

2. The compound as disclosed in claim 1 wherein the same is

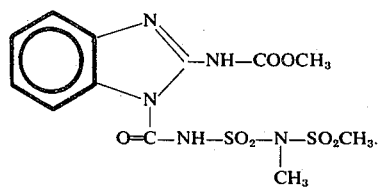

3. The compound as disclosed in claim 1 wherein the same is

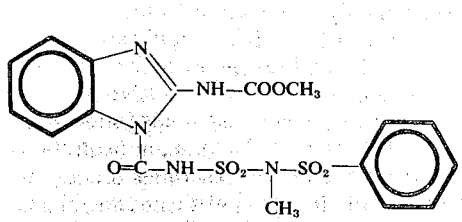

4. The compound as disclosed in claim 1 wherein the same is

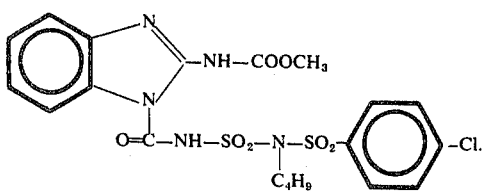
5. The compound as disclosed in claim 1 wherein the same is
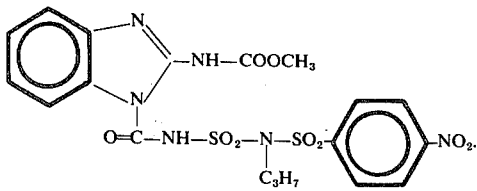
6. The compound as disclosed in claim 1 wherein the same is
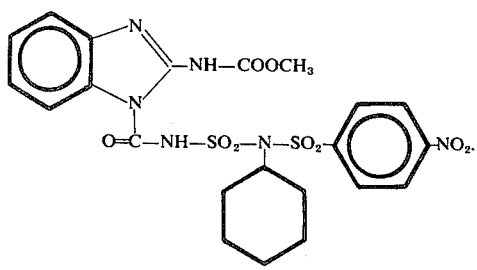
7. The compound as disclosed in claim 1 wherein the same is
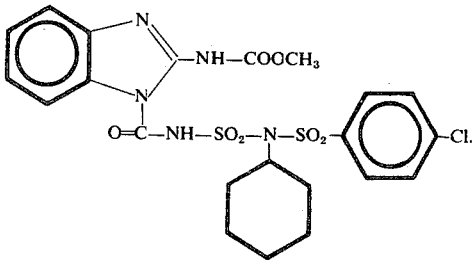
8. The compound as disclosed in claim 1 wherein the same is
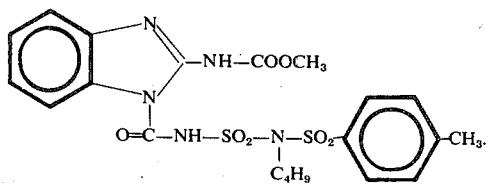
* * * * *